Jan. 15, 1924.
J. H. MacMAHON
1,481,106
PREPARATION OF LIQUID BLEACH SOLUTIONS
Filed Sept. 20, 1922
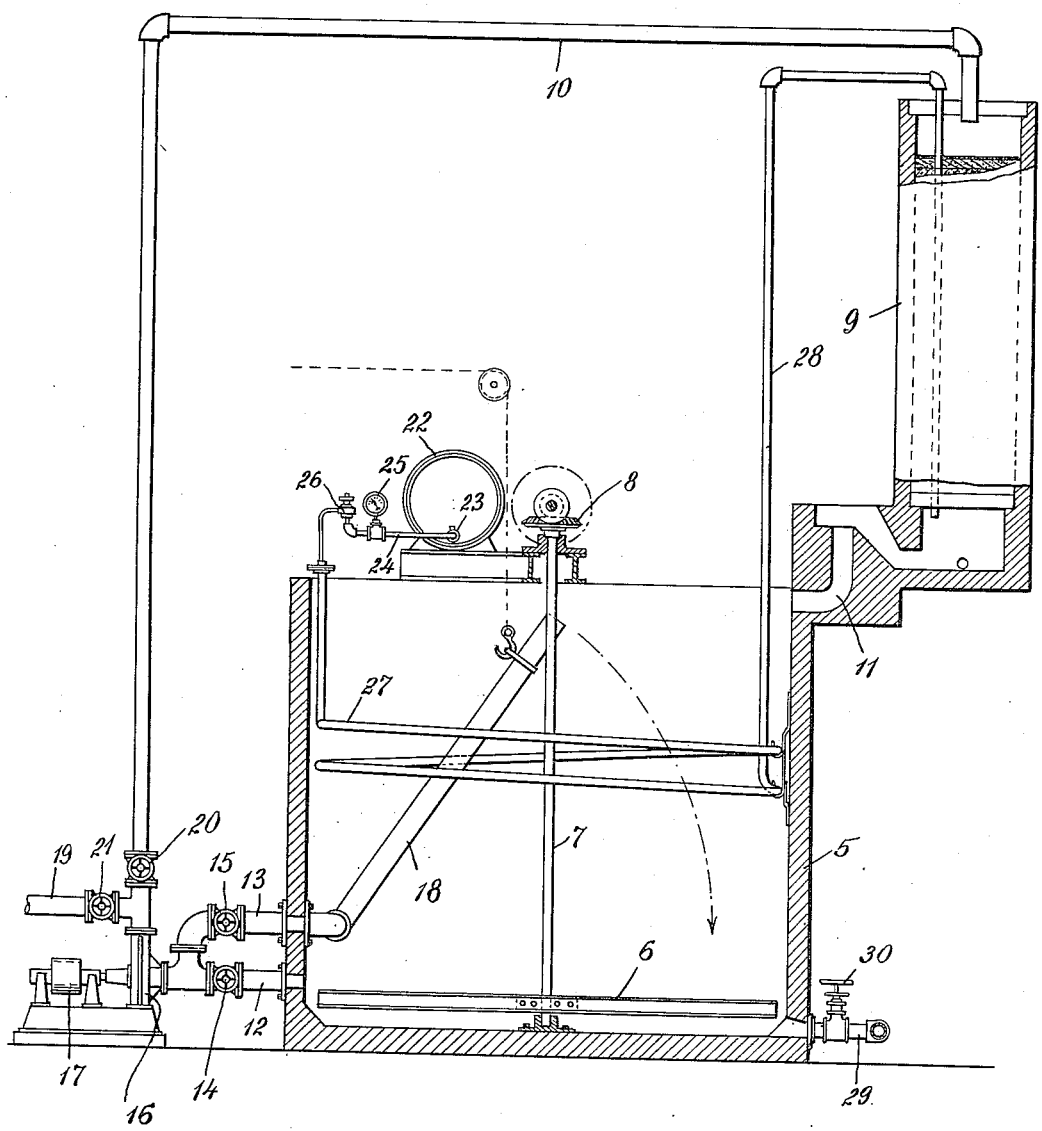
INVENTOR
James H. MacMahon
BY
Pennie Davis Marvin & Edmonds
ATTORNEY Patented Jan. 15, 1924.

1,481,106

UNITED STATES PATENT OFFICE.

JAMES H. MacMAHON, OF NIAGARA FALLS, NEW YORK, ASSIGNOR TO THE MATHIESON ALKALI WORKS, INC., OF NEW YORK, N. Y., A CORPORATION OF VIRGINIA.

PREPARATION OF LIQUID-BLEACH SOLUTIONS.

Application filed September 20, 1922. Serial No. 589,328.

*To all whom it may concern:*

Be it known that I, JAMES H. MACMAHON, a citizen of the United States, residing at Niagara Falls, in the county of Niagara, State of New York, have invented certain new and useful Improvements in the Preparation of Liquid-Bleach Solutions; and I do hereby declare the following to be a full, clear, and exact description of the invention, such as will enable others skilled in the art to which it appertains to make and use the same.

This invention relates to the preparation of liquid bleach solutions and the like requiring the combination of a gaseous reagent with other reagents in solution or suspension.

The manufacture of liquid bleach solutions by passing chlorine gas into milk of lime, caustic soda solutions or similar alkalies has long been known. It is customary, for example, in preparing these solutions on a small scale to simply pass the gas into the alkali solution until the reaction has been carried to the desired extent. In making such solutions, however, the temperature should not rise above approximately 40° C. since the solutions are unstable and their rate of decomposition increases very rapidly at temperatures above that noted. For this reason it is customary to make only dilute solutions starting with a cold alkaline solution, or when more concentrated solutions are made, artificial refrigeration is employed to maintain the temperature below the critical point. This refrigeration has been accomplished, for example, by the addition of ice or by cooling with brine coils.

Another difficulty experienced in the preparation of liquid bleach solutions results from the inability of the operator to accurately control the end point. It is usual to prepare such solutions in absorption towers where milk of lime, for example, is subjected to the action of chlorine gas which is introduced at the base of the tower. The solution flows from the tower to a tank and is thence returned to the tower by means of a pump. The only practicable means for determining when the solution is finished is by titrating the liquor for its chlorine content, and inasmuch as the chlorine is continuously entering the tower the operator is usually unable to satisfactorily determine the point at which the introduction of chlorine should be stopped. More frequently than otherwise the liquor will contain more or less chlorine than is desirable and the introduction of excess chlorine usually results in the rapid decomposition of the liquor and interferes with the settling of sludge therefrom.

It is one of the objects of the present invention to provide a method whereby solutions of relatively high concentration may be produced without danger of objectionable over-heating of the solution.

A further object of the invention is the provision of a method whereby the concentration of the liquor may be accurately controlled in a simple and expeditious manner.

In carrying out the invention liquid chlorine is employed and is brought, while still in a liquid state, directly into or into heat-interchanging relation with the alkaline solution with which it is to be combined to form the bleach solutions, and advantage is thus taken of the considerable latent heat of vaporization of the liquid chlorine to cool the alkaline solution. Thus the necessity for refrigeration by the use of brine coils or similar expedients is avoided. The reaction is conducted moreover with predetermined quantities of the reagents involved, or in other words by passing a unit weight of chlorine into a unit volume of milk of lime or other alkaline solution containing sufficient lime or other alkali to combine with the chlorine and produce a bleach solution of the desired strength. Thus, if the volume of alkaline solution is the same for each successive batch and the weight of chlorine is also the same, a liquor of uniform strength will always be produced and the amount of alkali can be so finely adjusted to the chlorine that liquors of alkaline or neutral characteristics can be produced readily and over-chlorination can be entirely avoided.

Various methods of procedure can be followed in carrying out the invention. The liquid chlorine can be supplied from the usual form of container but the container should be so arranged as to permit the withdrawal of the chlorine in the liquid state instead of in a gaseous state, thus avoiding vaporization of the chlorine in the container and the consequent lowering of the temperature. By avoiding this lowering of temperature in the chlorine container, the necessity for heating the container is likewise avoided. When the chlorine is supplied in large containers holding, for example, one ton or more of liquid chlorine, utilization of the liquid chlorine directly according to the present invention eliminates the necessity for the provision of a heating and vaporizing container intermediate the large chlorine container and the alkaline solution to heat the liquid chlorine and supply its heat of vaporization. The present invention accordingly results in a marked simplification in the handling of liquid chlorine for the purposes herein described.

The conducting of the liquid chlorine into or into heat-interchanging relation with the alkaline solution can be carried out in various ways. One advantageous operation is to introduce the liquid chlorine through a metal pipe coil, preferably of lead, placed in the bottom of the tank containing the alkaline solution, one end of this coil being connected to the liquid chlorine supply and the other being provided with a nozzle for breaking up the steam of chlorine gas or with an injector nozzle to insure circulation of the liquid. Instead of introducing the chlorine gas through a nozzle it may be introduced through a number of small perforations arranged at intervals along the length of a pipe coil in which case the coil may be closed at its end. The pipe coil should be long enough to provide the necessary heat-interchange so that the liquid chlorine therein will be vaporized by the heat of the surrounding solution. The solution will itself be cooled by the low temperature at which the vaporization of the liquid chlorine takes place so that the heat of the original solution, together with the heat of reaction, will supply the heat necessary for vaporization of the liquid chlorine and so that the vaporization of the liquid chlorine will in turn counteract the heat of reaction and prevent the temperature from rising to an objectionable degree. When the chlorine is introduced through such a pipe coil the liquid chlorine should not ordinarily be permitted to escape into the solution in liquid form since the vaporization of the liquid when so introduced would cause the formation of relatively large bubbles of chlorine which would not be absorbed readily, while the introduction of the chlorine in this way would tend to cause local supersaturation of the solution and local over-heating. Where the chlorine is first vaporized and then introduced in gaseous form, and particularly where the solution is rapidly agitated either by the introduction of chlorine through an injector nozzle or by the provision of mechanical agitating means, or where the solution is of sufficient depth to permit substantially complete absorption of the chlorine gas introduced therein, the solution can be chlorinated and relatively strong bleach solutions can be produced without objectionable over-heating.

Another method of introducing the liquid chlorine into the bleach solution is to atomize the liquid in very fine streams directly into the solution, the streams being sufficiently fine to avoid the formation of gas bubbles of excessive size due to the vaporization of the liquid chlorine. The alkaline solution may be agitated vigorously to insure rapid dissemination of the chlorine.

Another method of introducing the liquid chlorine is to atomize it into an apparatus in which the alkaline solution is sprayed or showered through a chamber or tower so that the liquid chlorine will be vaporized and will form a chlorine atmosphere through which the alkaline solution is showered at a temperature which is maintained sufficiently low by the vaporization of the liquid chlorine. The alkaline solution can be recirculated if necessary to further increase its strength or it can be passed down through a tower containing obstructions to retard its flow and to expose a maximum surface of the alkaline solution to the gas. Instead of introducing the liquid chlorine directly into the tower or apparatus into which the alkaline solution is introduced, the chlorine may first be passed through a pipe coil submerged in the alkaline solution to accomplish the vaporization or partial vaporization of the liquid chlorine and the simultaneous cooling of the solution. This cooling may be accomplished at the base of the tower through which the alkaline solution flows or in a separate tank in which the solution is collected and from which it is returned to the tower for further absorption. The chlorine vaporized in the coil may be introduced therefrom into the tower where it contacts with the solution and accomplishes the desired reaction. As noted, the solution into which the chlorine is introduced may be the same body which is utilized for heating the liquid chlorine and bringing about its vaporization, or the body of alkaline solution can be circulated and brought into contact at one location with the chlorine gas and at another location into heat-interchanging relation with the liquid chlorine.

An improved apparatus embodying the invention and adapted for the practice thereof is illustrated in a somewhat conventional and diagrammatic manner in the accompanying drawings.

Referring to the drawing 5 indicates a tank provided with an agitating device 6 which may be mounted, for example, on a suitable shaft 7 and driven through beveled gearing 8 or other suitable driving connections from a source of power. A tower 9 is supported above the level of the tank and is adapted to be filled with suitable material to retard the flow of solution therethrough and thus expose a maximum surface to the gas. A pipe 10 is provided to deliver the solution to the tower and an outlet 11 from the tower permits return thereof to the tank. Outlets 12 and 13 controlled by valves 14 and 15 permit the withdrawal of liquid therefrom to the intake-side of a pump 16 which may be driven through a pulley 17 or other suitable driving connection from a source of power. A movable pipe 18 connected to the outlet 13 is adapted to be raised and lowered to permit decantation of the liquor in the tank. The outlet side of the pump is connected to the pipe 10 and to a discharge pipe 19, the pipes being controlled by valves 20 and 21 to permit circulation of the liquor or discharge thereof when finished.

A chlorine tank 22 is supported above the tank 5 and is provided with an outlet valve 23 through which the liquid chlorine is delivered to a pipe 24. A pressure gauge 25 and a pressure-reducing valve 26 are connected to the pipe 24 which delivers the liquid chlorine to a coil 27 disposed in the tank 5 and adapted to convey the liquid chlorine in heat-interchange with liquor whereby the chlorine is vaporized and the liquor is cooled. From the coil the gaseous chlorine is delivered through a pipe 28 to the tower 9 near the bottom thereof so that the gas passes upwardly through the tower and is absorbed by the liquor descending therein.

As an example of the operation of the invention the tank 5 may have a total capacity of 9200 gallons with an available capacity under practical conditions of 8000 gallons. It is designed to hold a sufficient quantity of milk of lime to absorb the contents of a container holding 2000 pounds of liquid chlorine to produce a bleach liquor with a chlorine content of 30 grams per liter corresponding to a strength of 7½° Bé., which is that most generally used in paper and pulp mills.

In operating the tank 5 is first filled with water to the required level and the circulating pump and agitator are started. Lime is then added, either in the form of quick lime or hydrated lime. If quick lime is used, one pound is required per pound of liquid chlorine. One and one-quarter pounds of hydrated lime per pound of liquid chlorine are required if hydrated lime is used in place of quick lime. In order to produce a liquor of uniform quality as hereinbefore described, the liquid chlorine container 22 should be capable of holding 2000 pounds of liquid chlorine. The chlorine is vaporized in the coil 27 and the gas passed to the tower where it is rapidly absorbed by the milk of lime, it being understood that the circulating pump 16 is in operation to deliver the liquor from the tank to the tower. The circulation of liquor by the pump is continued until all of the chlorine is absorbed, this being indicated by the pressure gauge 25. When the gauge registers 0 all of the chlorine will have been discharged and the container may be disconnected. The finished material is allowed to settle in the tank 5 and the liquor is decanted through the pipe 18 and delivered to the stock tanks. The small amount of sludge remaining after the preparation of each batch is allowed to accumulate until there is a sufficient quantity to warrant washing, when it is agitated with additional quantities of water. Clear wash water is separated from the sludge for use as "make-up" liquor for a fresh batch and the waste sludge is withdrawn through a waste pipe 29 controlled by a valve 30.

It will be understood that the present invention makes use in a particularly advantageous way the latent heat of vaporization of liquid chlorine to counteract the heat solution of the chlorine and the heat of reaction between the chlorine and the alkali in the solution while the heat of the original solution, together with the heat of reaction, are utilized to vaporize the liquid chlorine. The neutralization of the heat effects in this way is such that, for example, a hypochlorite solution can be made up with milk of lime and chlorine so as to contain as much as 100 grams or more of available chlorine per liter, and starting with milk of lime at an initial temperature of 20° C. the final temperature will not exceed 30° C. It will be evident that solutions of lower chlorine content may similarly be produced either directly by chlorination of the alkaline solution or indirectly by dilution of the stronger bleach solution produced, for example, with a chlorine content such as that described.

The invention is applicable not only to the production of bleach solutions by chlorinating milk of lime but also for the production of bleach solutions by chlorinating solutions of caustic soda or of other alkalies where heat of reaction is similarly developed by the chlorination and where the latent heat of vaporization of the chlorine can be utilized similarly in cooling the alkaline solution during or after the reaction. The present invention greatly simplifies the utilization of liquid chlorine as compared with methods heretofore commonly employed in that the heating of the liquid chlorine container itself (where a relatively small container is used) is avoided and in that a special evaporator in conjunction with large chlorine containers with special heating means for heating and vaporizing the chlorine is likewise unnecessary. This heating of a considerable quantity of liquid chlorine (which the present invention obviates) is attended with some danger, for example, in case the chlorine gas outlet becomes accidentally closed or where the temperature rises rapidly with resulting production of excessive pressures. At 100° C., the temperature of ordinary exhaust or wet steam which is sometimes employed for heating liquid chlorine to evaporate it, a pressure of 613 pounds per square inch is developed. The presence of such pressures in the system is avoided by the present invention. The cooling of the alkaline solution in the manner described involves a further simplification of the operation in that cooling means such as have been employed heretofore are dispensed with.

The present invention furthermore presents other advantages, first the control which the operator is able to exercise and whereby he can produce liquor of uniform and any desired strength by simply fixing the water level in the tank at the required point. This enables the conducting of bleaching operations with a greater certainty and important economies. Another feature of advantage is the facility afforded for guarding against over-chlorination during the preparation of the bleach liquor.

Various changes may be made in the details of the operation and of the apparatus described herein without departing from the invention or sacrificing any of the advantages thereof.

I claim:—

1. The method of preparing bleach solutions by subjecting an alkaline solution to the action of chlorine, which comprises vaporizing liquid chlorine by heat exchange relation with a body of the alkaline solution and causing the gaseous chlorine to contact with another body in which a large surface of the solution is exposed to the gas.

2. The method of preparing bleach solutions by subjecting an alkaline solution to the action of chlorine, which comprises vaporizing liquid chlorine by heat exchange relation with a body of the solution and causing the gaseous chlorine to travel countercurrent to a stream of the solution.

3. The method of preparing bleach solutions by subjecting an alkaline solution to the action of chlorine, which comprises vaporizing liquid chlorine by heat exchange relation with a body of the alkaline solution, causing the gaseous chlorine to contact with another body in which a large surface of the solution is exposed to the gas and returning the solution after contact with the chlorine to the body which is cooled by the vaporization of the chlorine.

4. The method of preparing bleach solutions by subjecting an alkaline solution to the action of chlorine, which comprises vaporizing liquid chlorine by heat exchange relation with a body of the alkaline solution, conveying the gaseous chlorine into contact with another body of the alkaline solution and continuously circulating the alkaline solution between the two bodies thereof.

5. The method of preparing bleach solutions by subjecting an alkaline solution to the action of chlorine, which comprises agitating the alkaline solution, passing liquid chlorine in heat exchange relation therewith and causing the resulting gaseous chlorine to directly contact with a circulating portion of the alkaline solution apart from that which is cooled by the vaporization of the chlorine.

6. The method of preparing bleach solutions by subjecting an alkaline solution to the action of chlorine, which comprises passing liquid chlorine in heat exchange relation with the alkaline solution and causing the resulting gaseous chlorine to directly contact with a circulating portion of the alkaline solution apart from that which is cooled by the vaporization of the chlorine.

7. The method of preparing bleach solutions of uniform strength by subjecting an alkaline solution to the action of chlorine, which comprises causing a predetermined volume of chlorine to combine with an alkali by the regulated introduction of the chlorine to an alkaline solution of predetermined strength and volume, the reaction being continued until the supply of chlorine is exhausted.

8. The method of preparing bleach solutions of uniform strength by subjecting an alkaline solution to the action of chlorine, which comprises causing a predetermined volume of chlorine to combine with an alkali by the regulated introduction of the chlorine to an alkaline solution of predetermined strength and volume, the reaction being continued until the supply of chlorine is exhausted, and absorbing the heat of reaction by vaporizing liquid chlorine in contact with the alkaline solution.

In testimony whereof I affix my signature.

JAMES H. MacMAHON.